(12) United States Patent
Li

(10) Patent No.: US 11,170,436 B2
(45) Date of Patent: Nov. 9, 2021

(54) CREDIT SCORING METHOD AND SERVER

(71) Applicant: TENCENT TECHNOLOGY (SHENZHEN) COMPANY LIMITED, Shenzhen (CN)

(72) Inventor: Xin Li, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 32 days.

(21) Appl. No.: 16/422,328

(22) Filed: May 24, 2019

(65) Prior Publication Data

US 2019/0279297 A1 Sep. 12, 2019

Related U.S. Application Data

(63) Continuation of application No. PCT/CN2018/074434, filed on Jan. 29, 2018.

(30) Foreign Application Priority Data

Feb. 8, 2017 (CN) .......................... 201710069578.6

(51) Int. Cl.
 *G06Q 40/02* (2012.01)
 *G06N 5/04* (2006.01)
 *G06N 20/00* (2019.01)

(52) U.S. Cl.
 CPC .......... *G06Q 40/025* (2013.01); *G06N 5/046* (2013.01); *G06Q 40/02* (2013.01); *G06N 20/00* (2019.01)

(58) Field of Classification Search
 None
 See application file for complete search history.

(56) References Cited

U.S. PATENT DOCUMENTS

2013/0262226 A1* 10/2013 LaChapelle ........ G06Q 30/0269
 705/14.53
2017/0032460 A1   2/2017 Szollar
   (Continued)

FOREIGN PATENT DOCUMENTS

CN   104866969 A   8/2015
CN   105225149 A   1/2016
   (Continued)

OTHER PUBLICATIONS

The World Intellectual Property Organization (WIPO) International Search Report for PCT/CN2018/074434 dated Apr. 20, 2018 5 Pages (including translation).
(Continued)

*Primary Examiner* — Joseph W. King
*Assistant Examiner* — Amit Patel
(74) *Attorney, Agent, or Firm* — Anova Law Group, PLLC

(57) ABSTRACT

A credit scoring method and a server are provided. The method includes: determining at least one target user set in a plurality of user sets. The at least one target user set includes first behavior-unknown users whose predicted profit values are higher than second behavior-unknown users, the second behavior-unknown users are users other than the first behavior-unknown users on an application platform. The method also includes determining credit scores of first behavior-unknown users according to credit scores of behavior-known users in at least one determined target user set; obtaining first user samples from the first behavior-unknown users according to credit records of the first behavior-unknown users, the first user samples having profit values that satisfy a preset threshold; and performing credit scoring for a user according to a second scoring model (Continued)

obtained through training a first scoring model according to the first user samples and second user samples.

20 Claims, 5 Drawing Sheets

(56) References Cited

U.S. PATENT DOCUMENTS

2018/0137565 A1    5/2018   Lu
2018/0276748 A1    9/2018   Chen et al.

FOREIGN PATENT DOCUMENTS

| | | |
|---|---|---|
| CN | 105701706 A | 6/2016 |
| CN | 105894089 A | 8/2016 |
| CN | 105894372 A | 8/2016 |
| CN | 106156941 A | 11/2016 |
| CN | 106327326 A | 1/2017 |

OTHER PUBLICATIONS

The State Intellectual Property Office of the People's Republic of China (SIPO) Office Action 1 for 201710069578.6 dated Mar. 12, 2020 9 Pages (including translation).

\* cited by examiner

CREDIT SCORING METHOD AND SERVER

RELATED APPLICATIONS

This application is a continuation in part of PCT Patent Application No. PCT/CN2018/074434, filed on Jan. 29, 2018, which claims priority to Chinese Patent Application No. 201710069578.6, entitled "CREDIT SCORING METHOD AND APPARATUS" and filed with the China National Intellectual Property Administration on Feb. 8, 2017, the entire contents of all of which are incorporated herein by reference.

FIELD OF TECHNOLOGY

The present disclosure relates to the field of network technologies, and in particular, to a credit scoring method and a server.

BACKGROUND OF THE DISCLOSURE

With development of network technologies, more users process various services through a network. For some services such as a loan-related service, a merchant needs to estimate a default risk of a user according to a credit score of the user, to set a maximum loan limit and the like for the user.

Currently, a user of an application platform has basic user attribute data, for example, basic information such as gender, age, and a district of the user. When the user uses the application platform, some behavior data, for example, a login record, a link click record, a message record, a shopping record, or a payment record, may usually be generated. Users may be divided into behavior-known users and behavior-unknown users according to an amount of behavior data. The behavior-unknown user is a user with little behavior data or even without behavior data. For the application platform, a borrowing capability of the user can be known in a more comprehensive manner if more behavior data are available. Considering a loan risk, a user sample is usually selected from the behavior-known users. A user feature of the user sample may be extracted according to behavior data and user attribute data of the user sample. A scoring model is trained by using the user feature of the user sample, and a trained scoring model is configured to perform credit scoring for the user.

In a process of implementing the present disclosure, it is found that the existing technology at least has the following problems:

Due to a limitation of the user sample, the scoring model obtained through training can be configured to perform accurate credit scoring for only the behavior-known users, but cannot be configured to perform accurate credit scoring for the behavior-unknown users. In this case, a credit-related service provided by the application platform can cover only a small quantity of users. Therefore, some potential users cannot be prompted to use the service on the application platform. Consequently, a user conversion rate of the application platform is low.

SUMMARY

To resolve a problem in the existing technology, embodiments of the present disclosure provide a credit scoring method and a server. The technical solutions are as follows:

According to an aspect, a credit scoring method is provided. The method includes: determining, by a computing device, at least one target user set in a plurality of user sets. The at least one target user set includes first behavior-unknown users whose predicted profit values are higher than second behavior-unknown users, the second behavior-unknown users are users other than the first behavior-unknown users on an application platform. The method also includes determining, by the computing device, credit scores of the first behavior-unknown users according to credit scores of behavior-known users in the at least one target user set; obtaining, by the computing device, first user samples from the first behavior-unknown users according to credit records of the first behavior-unknown users after the credit scores are determined, the first user samples having profit values that satisfy a preset threshold. The method also includes training, by the computing device, a first scoring model according to the first user samples and second user samples, to obtain a second scoring model, the first scoring model being a model that performs credit scoring according to user features; and performing credit scoring for a user on the application platform according to the second scoring model.

According to another aspect, a server is provided. The server includes a processor and a memory, the memory being configured to store instructions capable of being executed by the processor, and the processor being configured to execute the instructions, to perform the following steps: determining at least one target user set in a plurality of user sets. The at least one target user set includes first behavior-unknown users whose predicted profit values are higher than second behavior-unknown users, the second behavior-unknown users are users other than the first behavior-unknown users on an application platform. The processor is also configured to perform: determining credit scores of the first behavior-unknown users according to credit scores of behavior-known users in the at least one target user set; obtaining first user samples from the first behavior-unknown users according to credit records of the first behavior-unknown users after the credit scores are determined, the first user samples having profit values that satisfy a preset threshold. The processor is also configured to perform: training a first scoring model according to the first user samples and second user samples, to obtain a second scoring model, the first scoring model being a model that performs credit scoring according to user features; and performing credit scoring for a user on the application platform according to the second scoring model.

According to still another aspect, a non-transitory computer-readable storage medium storing instructions is provided. The instructions, when being executed by a processor in an application server, cause the processor to perform: determining at least one target user set in a plurality of user sets. The at least one target user set includes first behavior-unknown users whose predicted profit values are higher than second behavior-unknown users, the second behavior-unknown users are users other than the first behavior-unknown users on an application platform. The instructions also cause the processor to perform: determining credit scores of the first behavior-unknown users according to credit scores of behavior-known users in the at least one target user set; obtaining first user samples from the first behavior-unknown users according to credit records of the first behavior-unknown users after the credit scores are determined, the first user samples having profit values that satisfy a preset threshold. The instructions also cause the processor to perform: training a first scoring model according to the first user samples and second user samples, to obtain a second scoring model, the first scoring model being a model that performs credit scoring according to user features; and performing credit scoring for a user on the application platform according to the second scoring model.

The technical solutions provided in the embodiments of the present disclosure have the following beneficial effects:

Credit scoring is performed for the first behavior-unknown users having higher predicted profit values, the first user samples are selected from the first behavior-unknown users according to the credit records after the credit scores are determined, and the first scoring model is trained by using the first user samples and the second user samples, so that the second scoring model obtained through training can be configured to perform accurate credit scoring for the behavior-unknown users, thereby expanding user coverage of a credit-related service of the application platform. Therefore, some potential behavior-unknown users also can use the credit-related service on the application platform, thereby increasing a user conversion rate of the application platform.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the technology may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

Figure 1:
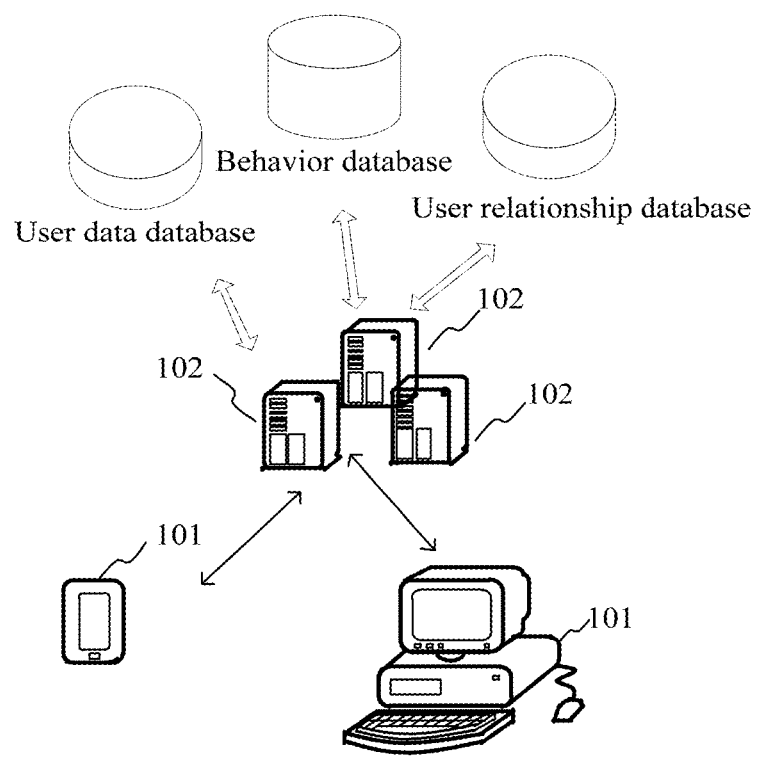
FIG. 1 is a diagram of a system architecture of an application platform according to an embodiment.

FIG. 1 is a diagram of a system architecture of an application platform according to an embodiment. The application platform may perform credit scoring for a user. The application platform may provide various services, for example, a loan service, a utility payment service, a credit card repayment service, a shopping service, an instant messaging service, an information sharing service, a resource service, an equipment renting service, etc. The user may perform various activities on the application platform, such as instant messaging, shopping, reading or article forwarding, information sharing, resource sharing, resource play, renting and returning equipment (e.g., car, bike, Wi-Fi hotspot, camera, phone, tablet, battery power bank), taking out a loan and making payments, and the like on corresponding application clients. By providing the various services, the application platform may earn profit for facilitating certain services or for presenting advertisements to users that obtain certain services.

The system architecture of the application platform includes an application client 101 and an application server 102. The user may register an account on the application client 101, and fill out personal basic information, for example, basic information of the user such as age, gender, occupation, a district (for example, a city that the user lives in), and education. In some embodiments, the personal basic information of the user is used as user attribute data of the user.

The application server 102 may be configured with a plurality of databases, for example, a user data database, a behavior database, and a user relationship database. The user data database is configured to store a correspondence between the user account and the user attribute data, and the user behavior database is configured to store behavior data of the user. The behavior data may be some data generated when the user uses the application platform. For example, the behavior data may be a login record, a link click record, an information sharing record, a shopping record, a payment record, a renting and returning record, or the like. The user relationship database is configured to store a friend relationship between users. In some embodiments, a user whose behavior data record quantity is less than a preset record threshold is referred to as a behavior-unknown user, and a user other than the behavior-unknown user is referred to as a behavior-known user. The preset record threshold may be set or modified by the application server according to a service requirement. This is not limited in this embodiment.

When the user data database stores the correspondence between the user account and the user attribute data, the user account may be stored corresponding to the user attribute data, so that during query, corresponding user attribute data may be found by using the user account.

It should be noted that the application server may perform credit scoring for the user of the application platform according to a scoring model. The application server may further periodically train and update the scoring model, to increase accuracy of credit scoring of the scoring model, and expand user coverage in which credit scoring can be performed. According to a credit scoring method provided in some embodiments, accurate credit scoring can be performed for the behavior-unknown user. For a detailed process, refer to an embodiment provided in FIG. 2.

Figure 2:
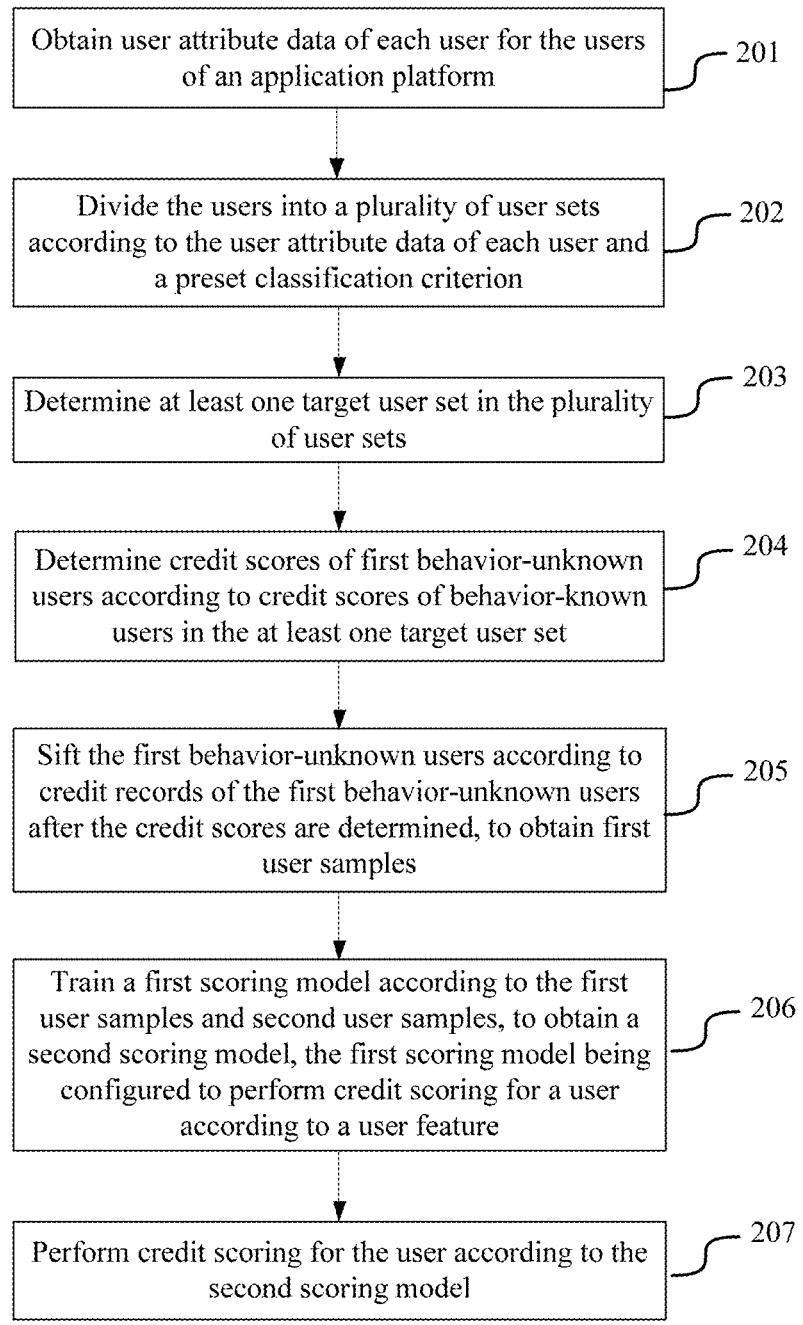
FIG. 2 is a flowchart of a credit scoring method according to an embodiment of the present disclosure.

FIG. 2 is a flowchart of a credit scoring method according to an embodiment of the present disclosure. Referring to FIG. 2, a method procedure provided in some embodiments of the present disclosure includes the following steps:

201. An application server obtains user attribute data of each user for the users of an application platform.

The application server may obtain the user attribute data of each user from a database according to a correspondence between a user account and the user attribute data. Certainly, because the application platform may have a large quantity of users, for example, ten millions of users or hundreds of millions of users. To improve efficiency of subsequently obtaining a target user set and determining first user samples, in this step, according to a service type of an application scenario of credit scoring, user attribute data of some users matching the service type may further be obtained. Different service types may be used to indicate that services are provided to different objects. For example, the service type may be a white-collar service, a small business service, or a town service. The white-collar service may be used to indicate that a service is provided to white-collar workers. The small business service is used to indicate that a service is provided to small enterprises. The town service is used to indicate that a service is provided to users in towns and rural areas. Some users matching the service type are users to which a service of the service type is provided. Further, according to a preset ratio, the preset ratio of users may be selected from the users matching the service type. The preset ratio may be preset or modified by the application server. This is not limited in this embodiment.

202. The application server divides the users into a plurality of user sets according to the user attribute data of each user and a preset classification criterion.

In some embodiments, the users of the application platform may be divided into the plurality of user sets according to the preset classification criterion. The preset classification criterion may be a classification criterion that is based on districts, age groups, occupations, or the like. For example, users in a city may be divided into a user set; or users may be divided into a plurality of age groups such as a youth group, a middle age group, and a senior group, and users in each age group are divided into a user set. Certainly, different classification criteria may be comprehensively considered. For example, user sets are divided according to districts and age groups. For example, young users in a city are divided into a user set, and middle-aged users in the city are divided into a user set. This is not limited in this embodiment. Certainly, the preset classification criterion may alternatively be executed based on similarity between the user attribute data of the users. Users whose user attribute data has higher similarity are divided into a user set.

Specifically, in a division manner based on similarity, the step may include the following step 2021 and step 2022.

Step 2021. The application server quantizes the user attribute data of each user to a vector.

In some embodiments, the application server may use the vector to represent the user attribute data of each user, and may use each element in the vector to represent one type of attribute data of the user. It is assumed that the user attribute data includes five user attributes: age, gender, occupation, education, and district, the user attribute data of each user may be quantized to a 5-dimensional vector, and each type of user attribute is quantized to an element of the vector. For example, a vector corresponding to a user A may be represented as UA=(age, occupation, gender, city, and education). Quantization means that some non-digit user attributes are quantized to digits. For example, 1 and 2 may be used to respectively represent male and female, and latitude and longitude or city code may be used to represent a district. A quantization method is not limited in this embodiment.

Step 2022. The application server uses a preset clustering algorithm to determine users whose vector distances are within a preset range as a user set, to obtain the plurality of user sets.

The process of using the preset clustering algorithm to divide the users of the application platform into the plurality of user sets is an iterative clustering process. Each iteration may include the following step a1 to step d1:

Step a1: The application server randomly initializes M reference vectors, where each reference vector corresponds to an initial user set, and M is a positive integer.

One vector corresponds to one point. The initializing M reference vectors is a process in which M vectors are randomly extracted as reference vectors, and each reference vector is used as a center point of the initial user set for a subsequent iterative clustering process.

Step b1: For the vector of each user, the application server determines a vector distance between the vector and each of the M reference vectors.

Step c1: For each user, the application server determines a designated reference vector having a smallest vector distance from the user, and divides the user into an initial user set corresponding to the designated reference vector.

Step d1: For each initial user set, the application server determines a central vector of users included in the initial user set, and does not stop using the central vector as a reference vector for a next iteration of the initial user set until the determined central vector is the reference vector.

To accurately find a central vector of each user set, the reference vector needs to be re-determined based on each iteration process, to ensure that user attribute data of users in a user set are similar.

It should be noted that one vector of the user may correspond to one point, and the central vector in step d1 is a center point of a plurality of points that correspond to users included in the initial user set. That is, a distance between the center point and the point corresponding to each user included the initial user set is equal.

Adaptive adjustment may be performed on the preset clustering algorithm according to different preset classification criteria. For example, when the preset classification criterion is district, reference vectors of the preset clustering algorithm may be vectors representing different districts. To improve clustering efficiency, the M reference vectors may be initialized according to the preset classification criterion. For example, when the preset classification criterion is district, points corresponding to the M reference vectors may be positioned in a city in which users are relatively centralized. In the preset clustering algorithm, users whose vector distances from a reference vector are within the preset range are divided into a user set. The preset range may be determined by the preset classification criterion. This is not limited in this embodiment.

Steps 201 and 202 describe the process in which the users of the application platform are divided into the plurality of user sets. Users having similar user attribute data are divided into a same user set, so that credit scores of behavior-unknown users may be subsequently estimated according to credit scores of behavior-known users.

203. The application server determines at least one target user set in the plurality of user sets, predicted profit values of first behavior-unknown users in the at least one target user set being higher than predicted profit values of second behavior-unknown users other than the first behavior-unknown users on the application platform. In other words, the application server determines at least one target user set in a plurality of user sets, the at least one target user set including first behavior-unknown users whose predicted profit values are higher than second behavior-unknown users, the second behavior-unknown users being users other than the first behavior-unknown users on the application platform. In some embodiments, a profit value of a user can be understood as benefits that the user may bring to the application platform and may be related to one or more factors such as user engagement/activity level on the application platform, user credibility (e.g., in renting or loan services), service request frequency, service request amount, etc. Providing services to users with low profit value without discretion may harm the vitality of the application platform and may affect the application platform in providing normal services to users with regular profit values. For example, if user A does not return a rented camera within a scheduled time, and the same camera is booked by user B afterwards, then the application platform would need to compensate the loss of user B, and user A is corresponded with a low profit value. On the other hand, providing services to users with high profit value may increase the benefits of the application platform and/or may attract more flow of users to try services of the application platform. For example, if user C often shares popular or high-quality digital resources on the application platform, other users may find such resources from a search engine and start using the application platform for their own information sharing/downloading purposes. User C may correspond to a high profit value. If user D often performs online shopping using the application platform, the application platform may frequently receive income from user D. User D may also correspond to a high profit value. For users with few or no user activity information, the applicant server may predict a profit value of these users based on training model and/or learning algorithm using information from users with known activities.

In some embodiments, one or more of the plurality of user sets may be used as target user sets for a profit test. The profit test includes a target user set determining stage and a profit monitoring stage. The target user set determining stage is intended to select behavior-unknown users from the behavior-unknown users of the application platform, so that a profit of the application platform can be increased. The process may be that: Within a preset time segment, a target user set is determined in the plurality of user sets every preset period (i.e., at regular time intervals). The preset period is less than the preset time segment (i.e., a period of each regular interval is less than the preset time segment). That is, the preset time segment includes a plurality of preset periods. Behavior data of the users are continuously collected within the preset time segment, to facilitate exploring a predicated profit of the user set based on the behavior data of the user set. This equals to that the profit is predicated by observing behaviors of a plurality of users in the user set.

It should be noted that the application server may use a scoring model to perform credit scoring for users. The scoring model is usually periodically trained and updated. Each period has a training period and an application/implementation period. The training period is a period of time for the credit scoring, for example, three months or half a year. The application server trains the scoring model by using user attribute data and behavior data of user samples in the training period, and uses the trained scoring model to perform credit scoring for the users. The implementation period is effective duration of the credit scoring, for example, three months or half a year right after the credit scoring is completed. When the effective duration expires, the scoring model needs to be re-trained. The preset time segment may refer to a time segment indicated by the application period. That is, in some embodiments, in the time segment indicated by the application period, behavior-unknown users that can increase the profit of the application platform are selected, to facilitate subsequently expanding user coverage in which the application platform can perform accurate credit scoring.

The first behavior-unknown users in the target user set may be all or some of behavior-unknown users in the target user set. This is not limited in this embodiment.

The process that a target user set is determined in the plurality of user sets may be implemented in any one of the following three manners:

First manner: Obtain a first random number between 0 and 1; generate a second random number between 0 and 1 by using the first random number as a probability; and if the second random number is less than the first random number, randomly select a user set in the plurality of user sets as the target user set; or if the second random number is not less than the first random number, use a user set having a largest profit value in the plurality of user sets as the target user set.

When the second random number is less than the first random number, it may be determined that profit values of the plurality of user sets are equivalent, and the randomly selected and determined target user set may be considered as a user set having a largest profit value. When behavior-unknown users in the user set have credit records, a profit value of the user set may refer to profit values of the behavior-unknown users in the user set; or when behavior-unknown users in the user set has no credit record, a profit value of the user set may refer to profit values of behavior-known users in the user set.

Second manner: Determine a profit value probability distribution of each user set according to the profit value of each user in each user set; generate a third random number according to the profit value probability distribution of each user set; and determine a user set having a largest third random number as the target user set.

In this manner, each user set may correspond to a profit value probability distribution, and the profit value probability distribution may comply with a $\beta$ distribution. The third random number corresponding to the user set may be used to indicate an average profit value of the user set.

The main idea of Thompson sampling is used in the second manner. It is assumed that whether each user group generates a profit has a probability distribution, and a profit generation probability is p; and then it is assumed that a probability distribution of the probability p complies with the $\beta$ distribution. The $\beta$ distribution has two parameters, wins and lose, and each user group maintains one parameter of the $\beta$ distribution. After each profit test, if there is a profit, wins of the user group is increased by 1; otherwise, loss of the user is increased by 1. A manner in which a user group is selected is that: a random number b is generated by using the existing $\beta$ distribution of each user group, and a user group having a largest random number in the user groups is selected.

Third manner: Obtain an average profit value of each user set and a standard deviation of the average profit value; and determine a sum of the average profit value of each user set and the standard deviation, and determine a user set having a largest sum as the target user set.

The average profit of each user set may be an average profit from a start of the process of selecting the target user set to a current period. A larger sum indicates a smaller average profit of the user set and a smaller profit variation range of each period.

An Upper Confidence Bound (UCB) algorithm is used in the third manner. A profit test is first performed once for each user group, and a user group having a largest average profit is selected as the target user group. When calculation is performed based on the algorithm, a larger average profit value and a smaller standard deviation indicate a higher probability that the user group is selected, thereby ensuring a maximum total profit. In addition, tests are also performed for user groups that are occasionally selected, thereby implementing exploration.

In some embodiments, a target user set may be determined in each preset period, and selecting the target user set is stopped in a proper time. This may include the following two manners:

In a manner, the target user set starts to be selected, and selecting the target user set is stopped when a preset time segment expires. Certainly, when the quantity of periods in which the target user set is selected exceeds a preset quantity, selecting the target user set is stopped.

In the other manner, more behavior-unknown users are involved when more target user sets are selected, and a possibly caused risk is higher. Therefore, selecting the target user set may be stopped when it is detected that continuous selection may result in a higher risk. The process may be that: in each period (i.e., during each period of the regular intervals), obtaining a first profit value that is of first behavior-unknown users in a first target user set and that is determined in a current period; obtaining a second profit value that is of first behavior-unknown users in a second target user set and that is determined in a previous period; and if a difference between the first profit value and the second profit value exceeds a preset variation range, stopping the step of determining the target user set in the plurality of user sets. The preset variation range may be set by the application server according to an actual service requirement or/and risk tolerance of the application platform. This is not limited in this embodiment. It should be noted that if the current period is the first period, the step of determining the target user set in the plurality of user sets continues being performed.

It should be noted that in addition to a manner in which a target user set is determined in the plurality of user sets in each preset period, in some embodiments, the at least one target user set may further be determined all at once in the plurality of user sets for a profit test. This is not limited in this embodiment.

204. The application server determines credit scores of the first behavior-unknown users according to credit scores of behavior-known users in the at least one target user set, where the first behavior-unknown users are users whose predicted profit values are higher than those of other behavior-unknown users.

For each target user set in the at least one target user set, a process of determining the credit scores of the first behavior-unknown users in the target user set may be: determining an average credit score of the behavior-known users in the target user set; and determining the average credit score as a credit score of each user in the first behavior-unknown users in the target user set. Certainly, the credit score of each user in the first behavior-unknown users in the target user set may also be determined in another manner. For example, a credit score is randomly selected in a preset initial credit score range, or a maximum credit score in an initial credit score range is used as the credit score of each user in the first behavior-unknown users in the target user set. This is not limited in some embodiments. The initial credit score range may be set or modified by the application server according to a service requirement or/and risk tolerance of the application platform. This is not limited in this embodiment.

It should be noted that if a target user set is determined in the plurality of user sets every preset period in step 203, after each time the target user set is determined, the step of determining credit scores of the first behavior-unknown users according to credit scores of behavior-known users in the target user set is performed.

After the credit score of the first behavior-unknown user is determined, the application platform may allocate a loan limit corresponding to the credit score for the first behavior-unknown user. Then, a profit monitoring stage of the first behavior-unknown user is entered. At the monitoring stage, the first behavior-unknown user may generate a credit record, and a corresponding application server may record the credit record of the first behavior-unknown user. It should be noted that if the at least one target user set is determined all at once in the plurality of user sets in step 203, the monitoring stage may be the entire preset time segment. However, if a target user set is determined in the plurality of user sets every preset period in step 203, for each target user set, the monitoring stage is a time segment from a time after the target user set is determined to a time when determining a target user set is stopped.

To make a process related to the period in the profit test in step 203 and step 204 clearer, the process is further described herein:

After the plurality of user sets is determined, the following steps a2 to c2 are performed for each period:

Step a2: Determine a target user set in the plurality of user sets in any one of the three manners in step 203 in which the target user set is determined.

Step b2: Perform credit scoring for the first behavior-unknown users in the target user set according to the credit scores of the behavior-known user in the target user set.

Step c2: Enter the profit monitoring stage of the target user set, record the credit records of the first behavior-unknown users in the target user set, and determine an average profit value of the first behavior-unknown users according to the credit records of the first behavior-unknown users.

Step a2 to step c2 are shown by using the process having only one period as an example. If the preset time segment is not reached currently, or an average profit value obtained in the current period and the average profit value obtained in the previous period do not exceed the preset variation range, step a2 to step c2 are repeatedly performed, and finally a profit test procedure is completed, to obtain the first behavior-unknown users in the at least one target user set and the credit records used to indicate profits of the first behavior-unknown users.

205. The application server sifts the first behavior-unknown users according to the credit records of the first behavior-unknown users after the credit scores are determined, to obtain first user samples. In other words, the application server obtains first user samples from the first behavior-unknown users according to credit records of the first behavior-unknown users after the credit scores of the first behavior-unknown users are determined, the first user samples having profit values that satisfy a preset threshold.

The first user samples are used to indicate first behavior-unknown users whose profit values determined according to the credit records satisfy a preset threshold. A process of sifting the first behavior-unknown users according to the credit records of the first behavior-unknown users after the credit scores are determined, to obtain first user samples may be: determining a profit value of each user in the first behavior-unknown users according to the credit records of the first behavior-unknown users; and using users that are in the first behavior-unknown users and whose profit values satisfy the preset threshold as the first user samples.

The credit record is used to indicate a value transfer record between a corresponding account of the application platform and a user account. For any user in the first behavior-unknown users, the application platform may determine a value transfer record between the user account and the corresponding account of the application platform according to the credit record of the user, and may determine the profit value of the user according to the value transfer record.

A value transferred from the corresponding account of the application platform to the user account may be set to a positive sign, and a value transferred from the user account to the corresponding account of the application platform is set to a negative sign. A profit value of a user may be obtained after a value corresponding to each value transfer record is added together.

The preset threshold includes a first preset threshold and a second preset threshold. The first preset threshold is greater than 0, and the second preset threshold is not greater than 0. Correspondingly, the process of using users that are in the first behavior-unknown users and whose profit values satisfy the preset threshold as the first user samples may be: determining behavior-unknown users that are in the first behavior-unknown users and whose profit values are greater than the first preset threshold and behavior-unknown users that are in the first behavior-unknown users and whose profit values are less than the second preset threshold as the first user samples. It should be noted that if a profit value of a user is greater than 0, it indicates that a default risk of the user is low; or if the profit value of the user is less than 0, it indicates that a default risk of the user is high. Default means that after a first value is transferred from the corresponding account of the application platform to the user account, no value is transferred from the user account to the application platform in a specified period. That is, the loan is not repaid. The specified period may be one day, two days, one week, or the like. It should be noted that if the profit value of the user is equal to 0, it indicates that the user has no credit record, and is not worth being used as a user sample. In some embodiments, a failure to return a rented product (e.g., in scheduled time) may also be considered as a default.

The behavior-unknown user whose profit value is greater than the first preset threshold is a user that has a low default risk and that brings about a high profit to the application platform. The behavior-unknown user whose profit value is less than the second preset threshold is a user that has a high default risk and that brings about no profit to the application platform. Therefore, based on the foregoing manner of determining the first user samples, the first user samples include both positive samples and negative samples, to represent features of the behavior-unknown users in a more comprehensive manner.

In addition, the credit record may further include a default label of a user. The default label is used to indicate whether the user is a default user. For example, when the default label is 0, it indicates that the user is not a default user; and when the default label is 1, it indicates that the user is a default user. When the quantity of default times of the user exceeds a preset quantity of times, the default label is 1. The preset quantity of times is greater than or equal to 1, and may be set by the application platform according to different service requirements. This is not limited in this embodiment.

To ensure that the first user samples can increase the profit of the application platform, in some embodiments, before the first user samples are determined, the profit values of the first behavior-unknown users may further be evaluated. The process may be: determining an average profit value of the first behavior-unknown users according to the profit value of each user in the first behavior-unknown users; and when the average profit value is greater than the preset threshold, performing the step of using users that are in the first behavior-unknown users and whose profit values satisfy the preset threshold as the first user samples.

206. The application server trains a first scoring model according to the first user samples and second user samples, to obtain a second scoring model, the first scoring model being configured to perform credit scoring for a user according to user features. In some embodiments, the first scoring model is a model with initial parameters that scores user credits based on user features, and when the first scoring model is trained based on a logistic regression model and a model having a desired fit to the training data and a desired generalization performance (e.g., on the test data) is obtained, such model is considered as the second scoring model.

The process of training a first scoring model according to the first user samples and second user samples, to obtain a second scoring model may be: obtaining user attribute data and behavior data of the first user samples, and extracting user features of the first user samples according to the user attribute data and the behavior data of the first user samples; obtaining user attribute data and behavior data of the second user samples, and extracting user features of the second user samples according to the user attribute data and the behavior data of the second user samples; and training the first scoring model according to the user feature of the first user samples and the user feature of the second user samples, to obtain the second scoring model.

The first user samples and the second user samples may be collectively referred to as user samples. Obtaining the behavior data of the user samples may be obtaining the behavior data of the samples in a historical time segment. The historical time segment may be a time segment indicated by the training period in step 203, or certainly may be another time segment. This is not limited in this embodiment.

For the user attribute data, a quantization manner in step 2021 may be used. The user attribute data of each user sample is quantized, and a quantized value of the user attribute data is used as a corresponding user feature of the user attribute data. For the behavior data, a user feature corresponding to the behavior data may be a frequency feature, a behavior sequence feature, or the like of the behavior data. Shopping behavior data of a user is used as an example. The quantity of shopping times of the user in the historical time segment may be used as a frequency feature of the shopping behavior data; a behavior sequence feature of the shopping behavior data may represent a consumption level of the user and consumption appropriateness, and the behavior sequence feature may be an average consumption value or a consumption variance of the user in the historical time segment. The average consumption value may represent the consumption level of the user, and the consumption variance may represent whether consumption of the user is appropriate.

The first scoring model may include a logistic regression unit and a score conversion unit. The logistic regression unit is configured to output a default probability of a user sample according to the user feature of the user sample. The score conversion unit is configured to convert the default probability of the user sample into a credit score. A higher default probability corresponds to a lower credit score, and a lower default probability corresponds to a higher credit score. Because whether the user sample is in default is known, adjustment may be performed according to a default label of the user sample and a parameter of a target function of the logistic regression unit until the default probability output by the logistic regression unit is equal to a default probability indicated by the default label. For a user sample whose default label is 0, a correspondingly output default probability is 0. For a user sample whose default label is 1, a correspondingly output default probability is 1. In some embodiments, the logistic regression model aims to train a function $f(X)=y$, where X represents users features and can be $\{x\_1, x\_2, \ldots, x\_n\}$, y is 0 or 1 depending on the default label. For training data, X and y are known, and parameters of the function can be adjusted/fitted accordingly. The fitted model can then be tested for its generalization performance. A model with desired fit with the training data and desired generalization performance can be found and used as the second scoring model. In some embodiments, machine learning algorithms/packages may be used for the training.

The score conversion unit may perform score conversion by using the following formula:

credit score=first boundary value+second boundary value*default probability where "*" represents a multiply operation, and the first boundary value and the second boundary value may be set or modified by the application platform according to an actual requirement. For example, the first boundary value may be 400, and the second boundary value may be 500. In this case, the credit score may fall within an interval from 400 to 900.

Figure 3:
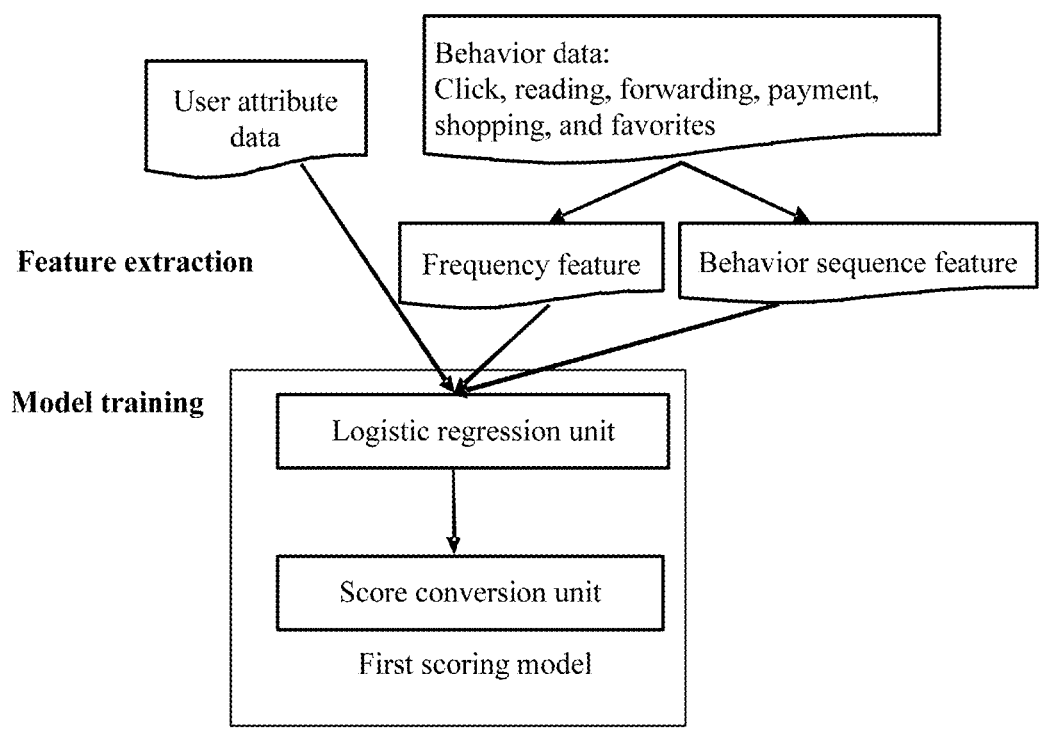
FIG. 3 is a framework diagram of training of a scoring model according to an embodiment of the present disclosure.

It should be noted that when the parameter of the target function of the logistic regression unit does not need to be adjusted, the second scoring model is obtained. FIG. 3 is a framework diagram of training the first scoring model according to the user attribute data and the behavior data of the user sample. The behavior data including a click record (click), a reading record (reading), a forwarding record (forwarding), a payment record (payment), a shopping record (shopping), and a favorites record (favorites) is used as an example and shown in the figure.

207. The application server performs credit scoring for a user on the application platform according to the second scoring model. The user may be any user operating an application client and requesting a service from the application platform.

The process of performing credit scoring for the user according to the second scoring model is similar to the process of training the first scoring model. A difference is that, in the process of performing credit scoring, the default label of the user does not need to be obtained, and a parameter of a target function of the second scoring model does not need to be adjusted. Similar content is not described in detail. It should be noted that the application server may periodically perform credit scoring for a user according to the scoring model, or credit scoring may be triggered by an operation of a user. For example, when needing to use a loan service provided by the application platform, the user may click a loan service option on a graphical user interface provided by an application client. When detecting a click operation on the loan service option, the application client sends a credit scoring request of the user to the application server, and then the application server performs, according to the credit scoring request of the user, credit scoring for the user by using the scoring model. After obtaining a credit score of the user, the server may determine a loan limit corresponding to the credit score. The server may further send the credit score and the corresponding loan limit to the application client, so that the application client displays the credit score and the corresponding loan limit. In some embodiments, when a user requests to rent a product on the application client and his/her credit score is lower than a first preset threshold, the application server may request a deposit higher than a normal amount (e.g., 50% higher than the normal amount) or deny the request. When the credit score of the user is higher than a second preset threshold, the application server may request a deposit lower than the normal amount or waive the deposit to encourage more frequent user activities. In some embodiments, the application client may display the credit score and present suggestion messages to increase the credit score based on user features, the suggestion messages may include links to shopping, renting or other services provided by the application platform. As the user establish a trait of benevolent activities on the application platform, the credit score may increase in the next preset time segment. In some embodiments, the application server may send promotion messages targeting users with high credit scores and the promotion messages are displayed on the application clients of the targeted users with selectable links.

Figure 4:
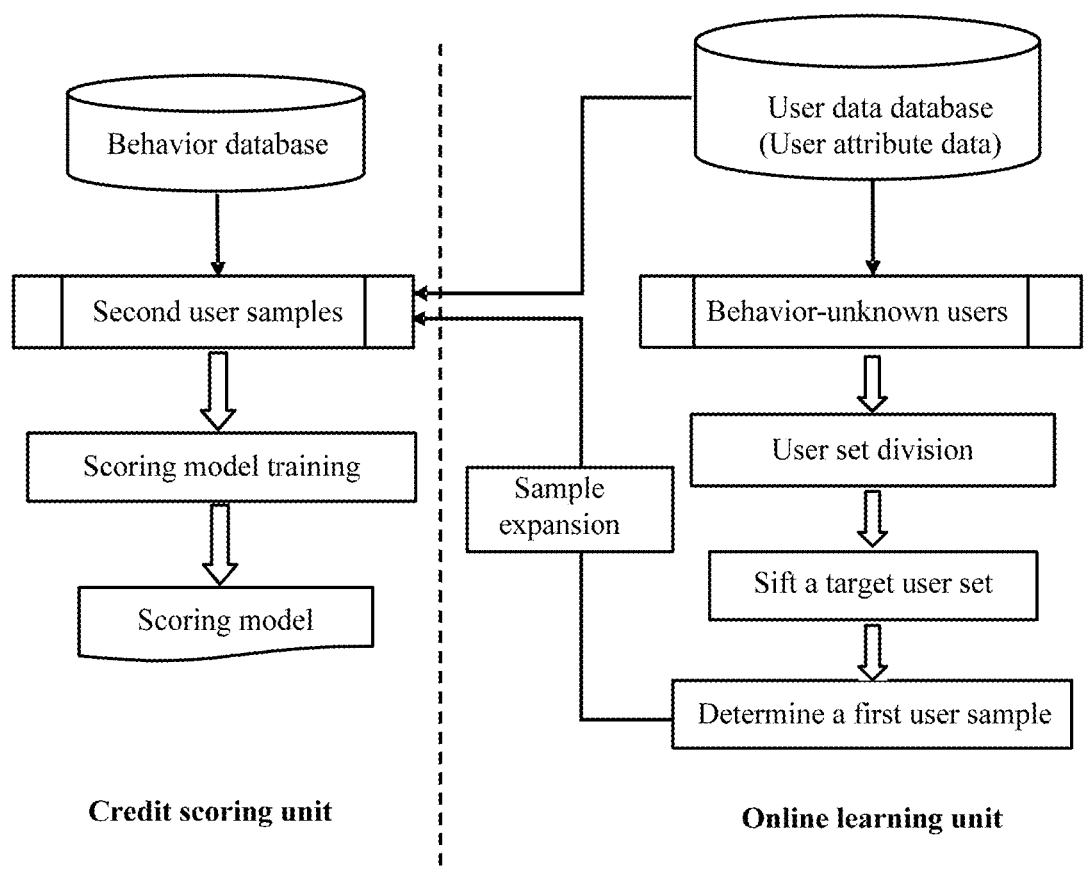
FIG. 4 is a structural diagram of a credit scoring system according to an embodiment.

To reflect the disclosure concept of some embodiments more clearly, FIG. 4 shows a structural diagram of a credit scoring system. Referring to FIG. 4, the credit scoring system includes a credit scoring unit and an online learning unit. The credit score unit is configured to: train a scoring model, and perform credit scoring for a user according to the trained scoring model. The online learning unit is configured to: divide behavior-unknown users of an application platform into user sets, sift a target user set, analyze a profit value of the target user set to determine first user samples, and add the first user samples to second user samples, so that the scoring model is jointly trained and updated by using the first user samples and the second user samples in a next training period of the scoring model. In this way, the scoring model can be configured to perform accurate credit scoring for some behavior-unknown users.

According to the method provided in some embodiments, credit scoring is performed for first behavior-unknown users having higher predicted profit values, the first user samples are selected from the first behavior-unknown users according to the credit records after credit scores are determined, and a first scoring model is trained by using the first user samples and the second user samples, so that a second scoring model obtained through training can be configured to perform accurate credit scoring for the behavior-unknown users, thereby expanding user coverage of a credit-related service of the application platform. Therefore, some potential behavior-unknown users also can use the service that is on the application platform and that is related to the credit, thereby increasing a user conversion rate of the application platform.

According to the method provided in some embodiments, a Bandit mechanism for online learning is mainly used. Based on an original credit investigation system framework, an online learning process is added. Credit scores of unknown people are explored, original credit scores are given to the unknown people according to a probability, and to-be-explored people are selected by using an epsilon-Greedy policy. Then, credit profit analysis is performed for the selected group. Finally, user coverage of a credit-related service of the application platform is expanded according to a profit update credit investigation policy, so that some potential behavior-unknown users also can use the credit-related service on the application platform, thereby increasing a user conversion rate of the application platform.

In addition, because the determined first user samples are samples helping increase a total profit of the application platform, when credit scoring is performed for the behavior-unknown users and user coverage of the credit scoring is expanded, maximization of the total profit of the application platform are also ensured, thereby reducing a profit risk of the application platform.

In addition, the process of determining the first user samples does not involve change of the first scoring model, and the first scoring model is trained only when a training and update period of the scoring model arrives. Therefore, the credit scoring method does not affect credit scoring of users by using a current first scoring model and operation of the credit-related service of the application platform. That is, according to the method, the unknown users are explored without affecting scores of the users and operation, to find a user group capable of obtaining a higher profit.

In addition, online profit test is performed for the behavior-unknown users, and credit records or behavior data of the behavior-unknown users may not need to be accumulated in a long period of time, so that credit estimation may be performed for the behavior-unknown users, thereby shortening credit scoring time, and increasing credit scoring efficiency.

Figure 5:
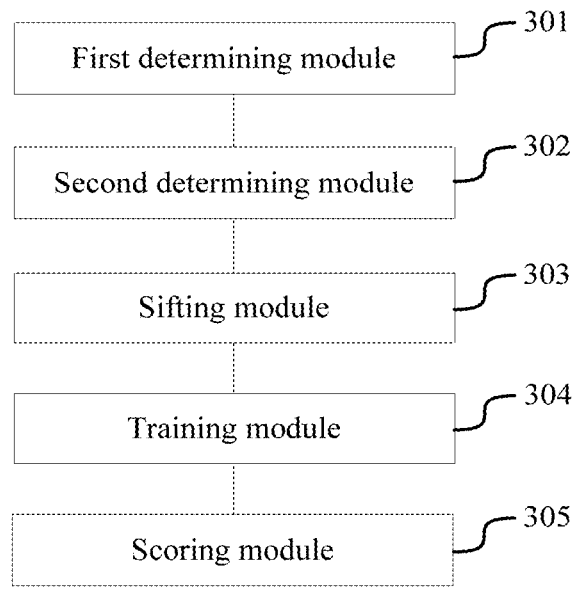
FIG. 5 is a block diagram of a credit scoring apparatus according to an embodiment of the present disclosure.

FIG. 5 is a block diagram of a credit scoring apparatus according to an embodiment of the present disclosure. Referring to FIG. 5, the apparatus includes a first determining module 301, a second determining module 302, a sifting module 303, a training module 304, and a scoring module 305.

The first determining module 301 is connected to the second determining module 302, and is configured to determine at least one target user set in a plurality of user sets, predicted profit values of first behavior-unknown users in the at least one target user set being higher than predicted profit values of second behavior-unknown users other than the first behavior-unknown users on an application platform; the second determining module 302 is connected to the sifting module 303, and is configured to determine credit scores of the first behavior-unknown users according to credit scores of behavior-known users in the at least one target user set; the sifting module 303 is connected to the training module 304, and is configured to sift the first behavior-unknown users according to credit records of the first behavior-unknown users after the credit scores are determined, to obtain first user samples, the first user samples being first behavior-unknown users that are determined according to the credit records and whose profit values satisfy a preset threshold; the training module 304 is connected to the scoring module 305, and is configured to train a first scoring model according to the first user samples and second user samples, to obtain a second scoring model, the first scoring model being configured to perform credit scoring for a user according to a user feature; and the scoring module is configured to perform credit scoring for the user according to the second scoring model.

In a possible implementation, the sifting module is configured to: determine a profit value of each user in the first behavior-unknown users according to the credit records of the first behavior-unknown users; and use users that are in the first behavior-unknown users and whose profit values satisfy the preset threshold as the first user samples.

In a possible implementation, the preset threshold includes a first preset threshold and a second preset threshold. The first preset threshold is greater than 0. The sifting module is configured to determine behavior-unknown users that are in the first behavior-unknown users and whose profit values are higher than the first preset threshold and behavior-unknown users that are in the first behavior-unknown users and whose profit values are less than the second preset threshold as the first user samples.

In a possible implementation, the apparatus further includes:

a third determining module, configured to determine an average profit value of the first behavior-unknown users according to the profit value of each user in the first behavior-unknown users; and the sifting module is configured to: when the average profit value is greater than the preset threshold, perform the step of using users that are in the first behavior-unknown users and whose profit values satisfy the preset threshold as the first user samples.

In a possible implementation, the second determining module is configured to: determine an average credit score of the behavior-known users; and determine the average credit score as the credit score of each user in the first behavior-unknown users.

In a possible implementation, the first determining module is configured to determine a target user set in the plurality of user sets every a preset period within a preset time segment, where the preset period is less than the preset time segment.

In a possible implementation, the apparatus further includes:

a first obtaining module, configured to obtain, within each period, a first profit value of a first behavior-unknown user in a first target user set determined in the current period; where the first obtaining module is configured to obtain a second profit value of a first behavior-unknown user in a second target user set determined in a previous period; and the first determining module is further configured to: when a difference between the first profit value and the second profit value exceeds a preset variation range, stop performing the step of determining a target user set in the plurality of user sets.

In a possible implementation, the first determining module is configured to:

obtain a first random number between 0 and 1; generate a second random number between 0 and 1 by using the first random number as a probability; and if the second random number is less than the first random number, select a user set in the plurality of user sets as the target user set; or if the second random number is not less than the first random number, use a user set that is in the plurality of user sets and that has a largest profit value as the target user set; or determine a profit value probability distribution of each user set according to the profit value of each user in each user set; generate a third random number according to the profit value probability distribution of each user set; and determine a user set having a largest third random number as the target user set; or obtain an average profit value of each user set and a standard deviation of the average profit value; and determine a sum of the average profit value of each user set and the standard deviation, and determine a user set having a largest sum as the target user set.

In a possible implementation, the apparatus further includes:

a second obtaining module, configured to obtain user attribute data of each user for the users of the application platform; and a division module, configured to divide the users into the plurality of user sets according to the user attribute data of each user and a preset classification criterion.

In a possible implementation, the training module is configured to: obtain user attribute data and behavior data of the first user samples, and extract a user feature of the first user samples according to the user attribute data and the behavior data of the first user samples; obtain user attribute data and behavior data of the second user samples, and extract a user feature of the second user samples according to the user attribute data and the behavior data of the second user samples; and train the first scoring model according to the user feature of the first user samples and the user feature of the second user samples, to obtain the second scoring model.

According to the apparatus provided in some embodiments of the present disclosure, credit scoring is performed for first behavior-unknown users having higher predicted profit values, the first user samples are selected from the first behavior-unknown users according to the credit records after credit scores are determined, and a first scoring model is trained by using the first user samples and the second user samples, so that a second scoring model obtained through training can be configured to perform accurate credit scoring for the behavior-unknown users, thereby expanding user coverage of a credit-related service of the application platform. Therefore, some potential behavior-unknown users also can use the service that is on the application platform and that is related to the credit, thereby increasing a user conversion rate of the application platform.

It should be noted that, when the credit scoring apparatus provided in the foregoing embodiment performs credit scoring, only divisions of the foregoing functional modules are described by using an example. During actual application, the foregoing functions may be allocated to and completed by different functional modules according to requirements, that is, the internal structure of the device is divided into different functional modules, to complete all or some of the foregoing described functions. In addition, the credit scoring apparatus provided in the foregoing embodiment belongs to the same concept as the embodiments of the credit scoring method. For a specific implementation process of the apparatus, refer to the method embodiment, and details are not described herein again.

Figure 6:
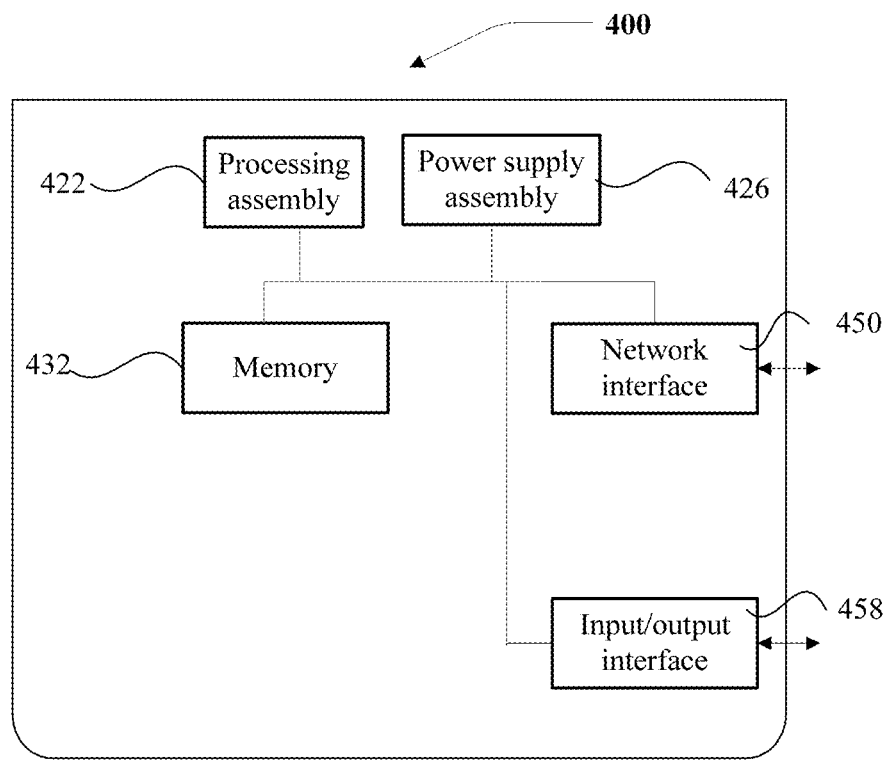
FIG. 6 is a block diagram of a credit scoring apparatus according to an embodiment of the present disclosure.

FIG. 6 is a block diagram of a credit scoring apparatus 400 according to an embodiment of the present disclosure. For example, the apparatus 400 may be provided as a server. Referring to FIG. 6, the apparatus 400 includes a processing assembly 422. The processing assembly 422 further includes one or more processors, and a memory resource represented by a memory 432. The memory resource is used for storing instructions, for example, an application program, that can be executed by the processing assembly 422. The application program stored in the memory 432 may include one or more modules each of which corresponds to a set of instructions. In addition, the processing assembly 422 is configured to execute the instructions, to perform the method performed by the server in the foregoing credit scoring method embodiments.

The apparatus 400 may further include a power supply assembly 426, configured to perform power supply management of the apparatus 400, a wired or wireless network interface 450, configured to connect the apparatus 400 to a network, and an input/output (I/O) interface 458. The apparatus 400 may operate an operating system stored in the memory 432, for example, Windows Server™, Mac OS X™, Unix™, Linux™, or FreeBSD™.

In an exemplary embodiment, a non-transitory computer readable storage medium including instructions is further provided, for example, a memory including instructions, and the foregoing instructions may be executed by a processor in an application server to complete the credit scoring method in the foregoing embodiments. For example, the non-transitory computer readable storage medium may be a ROM, a random access memory (RAM), a CD-ROM, a magnetic tape, a floppy disk, an optical data storage device, or the like.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A credit scoring method, comprising:
providing, for each of a plurality of users registered on an application platform, a graphical user interface at an application client operated by the user, the application client being remotely connected to an application server, the graphical user interface presenting a plurality of services offered by the application platform, the plurality of services including one or more of instant messaging, shopping, reading and article forwarding, information sharing, resource sharing, resource play, equipment rental, loan services, and electronic payment;
determining, by a computing device of the application server, at least one target user set in a plurality of user sets, the at least one target user set including first behavior-unknown users whose predicted profit values are higher than second behavior-unknown users, the second behavior-unknown users being users other than the first behavior-unknown users on the application platform, a profit value being determined according to at least one of: user activity level on the application platform, user credibility in renting or loan services, service request frequency, and service request amount;
determining, by the computing device, credit scores of the first behavior-unknown users according to credit scores of behavior-known users in the at least one target user set;
obtaining, by the computing device, first user samples from the first behavior-unknown users according to credit records of the first behavior-unknown users after the credit scores are determined, the first user samples having profit values that satisfy a preset threshold;
training, by the computing device, a first scoring model according to the first user samples and second user samples, to obtain a second scoring model, the first scoring model being a model that performs credit scoring according to user features, including:
determining, using the first scoring model, a default probability of a user sample according to a user feature of the user sample;
adjusting the first scoring model according to a default label of the user sample and parameters of a target function of a logistic regression model until the default probability determined by the logistic regression model is equal to a default probability indicated by the default label, the default label indicating a known status about whether the user sample is in default, including:
training, using a machine learning algorithm and a logistic regression method, the target function so that the parameters of the target function are adjusted and fitted according to user features of a plurality of user samples and the default labels of the corresponding user samples, to obtain a fitted model with a fitness;
testing the fitted model to obtain a generalization performance; and
repeating the training of the target function until the fitness and the generalization performance of the fitted model both reaches a preset condition; and obtaining the second scoring model when the parameter of the target function of the logistic regression model does not need to be adjusted, the second scoring model being the fitted model and capable of evaluating behavior-unknown users, wherein the determined first user samples and the second scoring model does not change the first scoring model, and the first scoring model is trained only when a corresponding training and update period arrives, keeping evaluations of behavior known users performed by the first scoring model unaffected;

receiving a service request from an application client, the service request being generated by the application client upon detecting a user selection on one of the plurality of services presented on the graphical user interface, the user being a behavior-unknown user;

in response to the service request, triggering the computing device to perform credit scoring for the user on the application platform according to the second scoring model, to obtain a user credit score, wherein the credit scoring does not need credit records or behavior data of the behavior-unknown user to be accumulated in an extended period of time, thereby shortening credit scoring time and increasing credit scoring efficiency;

generating a response corresponding to the service request according to the user credit score; and sending the response to the application client, wherein the response cause the application client to display the credit score on the graphical user interface, and to enable a connection link to a requested service specified by the response, wherein credit scores at different ranges correspond to different connection links.

2. The method according to claim 1, wherein the obtaining first user samples comprises:
determining a profit value of each user in the first behavior-unknown users according to the credit records of the first behavior-unknown users; and
using users that are in the first behavior-unknown users and whose profit values satisfy the preset threshold as the first user samples.

3. The method according to claim 2, wherein the preset threshold comprises a first preset threshold and a second preset threshold, the first preset threshold is greater than 0, the second preset threshold is not greater than 0, and the using users that are in the first behavior-unknown users and whose profit values satisfy the preset threshold as the first user samples comprises:
including a behavior-unknown user that is in the first behavior-unknown users and whose profit value is greater than the first preset threshold into the first user samples; and
including a behavior-unknown user that is in the first behavior-unknown users and whose profit value is less than the second preset threshold into the first user samples.

4. The method according to claim 2, wherein before the using users that are in the first behavior-unknown users and whose profit values satisfy the preset threshold as the first user samples, the method further comprises:
determining an average profit value of the first behavior-unknown users according to the profit value of each user in the first behavior-unknown users; and
performing the step of using the users that are in the first behavior-unknown users and whose profit values satisfy the preset threshold as the first user samples, if the average profit value is greater than the preset threshold.

5. The method according to claim 1, wherein the determining credit scores of the first behavior-unknown users according to credit scores of behavior-known users in the at least one target user set comprises:
determining an average credit score of the behavior-known users; and
assigning the average credit score as the credit score of each user in the first behavior-unknown users.

6. The method according to claim 1, wherein the determining at least one target user set in a plurality of user sets comprises:
determining a target user set in the plurality of user sets at regular intervals within a preset time segment, wherein a period of each regular interval is less than the preset time segment.

7. The method according to claim 6, further comprising:
during each period of the regular intervals,
obtaining a first profit value of first behavior-unknown users in a first target user set determined in a current period;
obtaining a second profit value of first behavior-unknown users in a second target user set determined in a previous period; and
stopping performing the step of determining the target user set in the plurality of user sets, if a difference between the first profit value and the second profit value exceeds a preset variation range.

8. The method according to claim 1, wherein the determining at least one target user set in a plurality of user sets comprises:
obtaining a first random number between 0 and 1; generating a second random number between 0 and 1 by using the first random number as a probability; and if the second random number is less than the first random number, selecting a user set in the plurality of user sets as the target user set; and if the second random number is not less than the first random number, using a user set that is in the plurality of user sets and that has a largest profit value as the target user set; or
determining a profit value probability distribution of each user set according to profit values of users in each user set; generating a third random number according to the profit value probability distribution of each user set; and determining a user set having a largest third random number as the target user set; or
obtaining an average profit value of each user set and a standard deviation of the average profit value; and determining a sum of the average profit value of each user set and the standard deviation, and determining a user set having a largest sum as the target user set.

9. The method according to claim 1, wherein before the determining at least one target user set in a plurality of user sets, the method further comprises:
obtaining user attribute data of each user for the users of the application platform; and
dividing the users into the plurality of user sets according to the user attribute data of each user and a preset classification criterion.

10. The method according to claim 1, wherein the training a first scoring model according to the first user samples and second user samples, to obtain a second scoring model comprises:
obtaining user attribute data and behavior data of the first user samples, and extracting a user feature of the first user samples according to the user attribute data and the behavior data of the first user samples;

obtaining user attribute data and behavior data of the second user samples, and extracting a user feature of the second user samples according to the user attribute data and the behavior data of the second user samples; and training the first scoring model according to the user feature of the first user samples and the user feature of the second user samples, to obtain the second scoring model.

11. A server, comprising a processor and a memory, the memory being configured to store instructions capable of being executed by the processor, and the processor being configured to execute the instructions, to perform:

providing, for each of a plurality of users registered on an application platform, a graphical user interface at an application client operated by the user, the application client being remotely connected to the server, the graphical user interface presenting a plurality of services offered by the application platform, the plurality of services including one or more of instant messaging, shopping, reading and article forwarding, information sharing, resource sharing, resource play, equipment rental, loan services, and electronic payment;

determining at least one target user set in a plurality of user sets, the at least one target user set including first behavior-unknown users whose predicted profit values are higher than second behavior-unknown users, the second behavior-unknown users being users other than the first behavior-unknown users on the application platform, a profit value being determined according to at least one of: user activity level on the application platform, user credibility in renting or loan services, service request frequency, and service request amount;

determining credit scores of the first behavior-unknown users according to credit scores of behavior-known users in the at least one target user set;

obtaining first user samples from the first behavior-unknown users according to credit records of the first behavior-unknown users after the credit scores are determined, the first user samples having profit values that satisfy a preset threshold;

training a first scoring model according to the first user samples and second user samples, to obtain a second scoring model, the first scoring model being a model that performs credit scoring according to user features, including:

determining, using the first scoring model, a default probability of a user sample according to a user feature of the user sample;

adjusting the first scoring model according to a default label of the user sample and parameters of a target function of a logistic regression model until the default probability determined by the logistic regression model is equal to a default probability indicated by the default label, the default label indicating a known status about whether the user sample is in default, including:

training, using a machine learning algorithm and a logistic regression method, the target function so that the parameters of the target function are adjusted and fitted according to user features of a plurality of user samples and the default labels of the corresponding user samples, to obtain a fitted model with a fitness;

testing the fitted model to obtain a generalization performance; and repeating the training of the target function until the fitness and the generalization performance of the fitted model both reaches a preset condition; and obtaining the second scoring model when the parameter of the target function of the logistic regression model does not need to be adjusted, the second scoring model being the fitted model and capable of evaluating behavior-unknown users, wherein the determined first user samples and the second scoring model does not change the first scoring model, and the first scoring model is trained only when a corresponding training and update period arrives, keeping evaluations of behavior known users performed by the first scoring model unaffected;

receiving a service request from an application client, the service request being generated by the application client upon detecting a user selection on one of the plurality of services presented on the graphical user interface, the user being a behavior-unknown user;

in response to the service request, triggering the computing device to perform credit scoring for a user on the application platform according to the second scoring model, to obtain a user credit score, wherein the credit scoring does not need credit records or behavior data of the behavior-unknown user to be accumulated in an extended period of time, thereby shortening credit scoring time and increasing credit scoring efficiency;

generating a response corresponding to the service request according to the user credit score; and sending the response to the application client, wherein the response cause the application client to display the credit score on the graphical user interface, and to enable a connection link to a requested service specified by the response, wherein credit scores at different ranges correspond to different connection links.

12. The server according to claim 11, the processor being configured to execute the instructions, to perform:

determining a profit value of each user in the first behavior-unknown users according to the credit records of the first behavior-unknown users; and using users that are in the first behavior-unknown users and whose profit values satisfy the preset threshold as the first user samples.

13. The server according to claim 12, the processor being configured to execute the instructions, to perform:

including a behavior-unknown user that is in the first behavior-unknown users and whose profit value is greater than a first preset threshold into the first user samples; and including a behavior-unknown user that is in the first behavior-unknown users and whose profit value is less than a second preset threshold into the first user samples, wherein the preset threshold comprising the first preset threshold and the second preset threshold, and the first preset threshold is greater than 0.

14. The server according to claim 12, the processor further being configured to execute the instructions, to perform:

determining an average profit value of the first behavior-unknown users according to the profit value of each user in the first behavior-unknown users; and performing the step of using the users that are in the first behavior-unknown users and whose profit values satisfy the preset threshold as the first user samples, if the average profit value is greater than the preset threshold.

15. The server according to claim 11, the processor being configured to execute the instructions, to perform:

determining an average credit score of the behavior-known users; and assigning the average credit score as the credit score of each user in the first behavior-unknown users.

16. The server according to claim 11, the processor being configured to execute the instructions, to perform:
determining a target user set in the plurality of user sets at regular intervals within a preset time segment, wherein a period of each regular interval is less than the preset time segment.

17. The server according to claim 16, the processor further being configured to execute the instructions, to perform:
during each period of the regular intervals,
obtaining a first profit value of first behavior-unknown users in a first target user set determined in a current period;
obtaining a second profit value of first behavior-unknown users in a second target user set determined in a previous period; and
stopping performing the step of determining the target user set in the plurality of user sets, if a difference between the first profit value and the second profit value exceeds a preset variation range.

18. A non-transitory computer-readable storage medium storing instructions, and the instructions being executed by a processor in an application server, to perform:
providing, for each of a plurality of users registered on an application platform, a graphical user interface at an application client operated by the user, the application client being remotely connected to the application server, the graphical user interface presenting a plurality of services offered by the application platform, the plurality of services including one or more of instant messaging, shopping, reading and article forwarding, information sharing, resource sharing, resource play, equipment rental, loan services, and electronic payment;
determining at least one target user set in a plurality of user sets, the at least one target user set including first behavior-unknown users whose predicted profit values are higher than second behavior-unknown users, the second behavior-unknown users being users other than the first behavior-unknown users on an application platform, a profit value being determined according to at least one of: user activity level on the application platform, user credibility in renting or loan services, service request frequency, and service request amount;
determining credit scores of the first behavior-unknown users according to credit scores of behavior-known users in the at least one target user set;
obtaining first user samples from the first behavior-unknown users according to credit records of the first behavior-unknown users after the credit scores are determined, the first user samples having profit values that satisfy a preset threshold;
training a first scoring model according to the first user samples and second user samples, to obtain a second scoring model, the first scoring model being a model that performs credit scoring according to user features, including:
determining, using the first scoring model, a default probability of a user sample according to a user feature of the user sample;
adjusting the first scoring model according to a default label of the user sample and parameters of a target function of a logistic regression model until the default probability determined by the logistic regression model is equal to a default probability indicated by the default label, the default label indicating a known status about whether the user sample is in default, including:
training, using a machine learning algorithm and a logistic regression method, the target function so that the parameters of the target function are adjusted and fitted according to user features of a plurality of user samples and the default labels of the corresponding user samples, to obtain a fitted model with a fitness;
testing the fitted model to obtain a generalization performance; and
repeating the training of the target function until the fitness and the generalization performance of the fitted model both reaches a preset condition; and
obtaining the second scoring model when the parameter of the target function of the logistic regression model does not need to be adjusted, the second scoring model being the fitted model and capable of evaluating behavior-unknown users, wherein the determined first user samples and the second scoring model does not change the first scoring model, and the first scoring model is trained only when a corresponding training and update period arrives, keeping evaluations of behavior known users performed by the first scoring model unaffected;
receiving a service request from an application client, the service request being generated by the application client upon detecting a user selection on one of the plurality of services presented on the graphical user interface, the user being a behavior-unknown user;
in response to the service request, triggering the computing device to perform credit scoring for the user on the application platform according to the second scoring model, to obtain a user credit score, wherein the credit scoring does not need credit records or behavior data of the behavior-unknown user to be accumulated in an extended period of time, thereby shortening credit scoring time and increasing credit scoring efficiency;
generating a response corresponding to the service request according to the user credit score; and
sending the response to the application client, wherein the response cause the application client to display the credit score on the graphical user interface, and to enable a connection link to a requested service specified by the response, wherein credit scores at different ranges correspond to different connection links.

19. The method according to claim 1, wherein:
when the service request is a loan request or a rent request, the response corresponding to the service request includes a limitation generated according to the user credit score, the limitation being a loan limit or a deposit requirement; and
the response causes the application client to enable the connection link to the loan request or the rent request corresponding to the limitation.

20. The method according to claim 1, wherein:
when the service request is a credit score request, the response corresponding to the service request includes suggestion messages generated according to the user credit score, the suggestion messages including links to one or more of the plurality of services provided by the application platform; and the response causes the application client to display the suggestion messages and to enable the links to the one or more of the plurality of services.

\* \* \* \* \*